United States Patent [19]
Kearney et al.

[11] Patent Number: 5,749,449
[45] Date of Patent: May 12, 1998

[54] COIL SPRING FOR OVERRUNNING SPRING CLUTCHES

[75] Inventors: Hugh L. Kearney, Cheshire; Charles J. Isabelle, Winsted; Jules G. Kish, Milford; William L. Noehren, Trumbull, all of Conn.

[73] Assignee: Sikorsky Aircraft Corporation, Stratford, Conn.

[21] Appl. No.: 767,562

[22] Filed: Dec. 16, 1996

[51] Int. Cl.$^6$ .................................... F16D 13/12
[52] U.S. Cl. ............................ 192/41 S; 192/74
[58] Field of Search ................. 192/41 S, 75, 192/56.2, 74; 188/77 W, 82.1, 82.6; 267/155

[56] References Cited

U.S. PATENT DOCUMENTS

| | | | |
|---|---|---|---|
| 1,836,199 | 12/1931 | Starkey | 192/41 S |
| 1,932,000 | 10/1933 | Starkey | 192/41 S |
| 1,953,370 | 4/1934 | Starkey | 192/41 S |
| 2,336,757 | 12/1943 | Starkey | 192/41 S |
| 4,570,318 | 2/1986 | Kish | 29/896.91 |
| 4,690,390 | 9/1987 | Kish | 267/155 |
| 4,926,991 | 5/1990 | Stone et al. | 192/41 S |
| 4,934,499 | 6/1990 | Kish | 192/41 S |
| 4,938,333 | 7/1990 | Kish | 192/41 S |

Primary Examiner—Rodney H. Bonck
Attorney, Agent, or Firm—Brian A. Collins

[57] ABSTRACT

A coil spring (50) for use in an overrunning spring clutch assembly having a central arbor (16) for centering and supporting the coil spring (50) in an overrunning operating mode. The coil spring (50) includes teaser coils (52) disposed at each end thereof, central coils (54) disposed intermediate the teaser coils (52), and transition coils (56) disposed between and adjoining the teaser coils (52) and the central coils (54). The coil spring (50) is characterized by each of the transition coils (56) having an interface surface ($56_{IS}$) being substantially complementary to a corresponding external bearing surface ($16_{ES}$) defined by the central arbor (16) of the spring clutch assembly. Such substantially complementary relationship limits the radial deflection of the transition coils (56) in the overrunning operating mode, thereby reducing vibratory bending stresses in the coil spring (50).

14 Claims, 4 Drawing Sheets

COIL SPRING FOR OVERRUNNING SPRING CLUTCHES

This invention was made with Government support Contract No. DAAJ0991-C-A004 awarded by the Department of the Army. The Government has certain rights in this invention.

TECHNICAL FIELD

This invention is directed to coil springs for use in overrunning spring clutch assemblies, and, more particularly, to an improved coil spring therefor which reduces vibratory bending stresses in the teaser and transition coils thereof in an overrunning operating mode.

BACKGROUND OF THE INVENTION

Overrunning spring clutches suitable for high torque applications, such as for transmission of torque from a helicopter gas turbine engine, have undergone extensive research and development during the past decade. The impetus therefor has been based upon the anticipated gains in operational reliability, i.e., the relatively low number of component parts, and the relative ease of assembly/disassembly of the spring clutch, i.e., as compared to conventional ramp roller, sprag, or centrifugal clutch assemblies.

An overrunning spring clutch operates on the principle that a coil spring expands or contracts radially in response to differential rotation of its opposite ends. In an expanded state, the coil spring may be caused to frictionally engage input and output clutch members to drive torque thereacross, and, in a contracted state, the coil spring may be caused to disengage the clutch members and permit an overrunning condition therebetween. With regard to the latter, an overrunning condition is an operational mode wherein the rotational speed of the output member exceeds that of the input member such as when the drive source is downthrottled or, in a helicopter application, when the main rotor is in an autorotative state.

This principle is best understood by referring to a representative prior art spring clutch assembly, as illustrated in FIG. 1. The spring clutch assembly 10 comprises an input clutch member 12, an output clutch member 14, a central arbor 16 and a coil spring 20. As shown, the input and output clutch members 12, 14 are coaxially aligned and separated by a small clearance gap 22. Furthermore, the input clutch member 12 is driven by a drive source 24, e.g., a helicopter gas turbine engine, and the output clutch member 14 includes an integrally formed pinion 25 as a means for providing drive output.

The coil spring 20 is disposed internally of and coaxially aligned with the input and output clutch members 12, 14 such that approximately one half of the coil spring 20 is disposed within each of the clutch members 12, 14, thereby bridging the gap 22 therebetween. Furthermore, the coil spring 20 is centered and supported by the central arbor 16 which is coupled to and rotates with the input clutch member 12. The proximal ends of the coil spring 20 include "teaser coils" 26 which are disposed in friction contact with cylindrical inner surfaces $12_{IS}$ and $14_{IS}$ of the input and output clutch members 12 and 14, respectively. The import of the teaser coils 26 is described in subsequent paragraphs.

In operation, torque drive is achieved when the rotational speed of the input clutch member 12 attempts to exceed the rotational speed of the output clutch member 14. In this operating mode, the teaser coils 26 frictionally engage the

2 cylindrical inner surface $14_{IS}$ of the output housing 14, thereby causing the entire coil spring 20 to unwind and expand outwardly against the cylindrical inner surfaces $12_{IS}$, $14_{IS}$ of the input and output clutch members 12, 14. Continued expansion of the coil spring 20 generates sufficient frictional force to drive high levels of torque from the input to the output clutch members 12, 14.

Overrunning is achieved when the output clutch member 14 "runs ahead" of the rotating coil spring 20. In this operating mode, the output clutch member 14 causes the teaser coils 26 to overwind the coil spring 20, thereby contracting the coil spring 20 and permitting the output clutch member 14 to rotate freely (albeit subject to a small frictional drag force associated with the teaser coils 26). In the overrunning mode, the coil spring 20 is seated upon and centered by the central arbor 16 which maintains the critical dimensional relationship between the teaser coils 26 and the cylindrical inner surfaces $12_{IS}$, $14_{IS}$ of the clutch members 12, 14. That is, for proper operation, the teaser coils 26 must effect a critical steady friction force on the clutch members 12, 14 during transition, e.g., from an overrunning mode to a torque drive mode.

Insofar as the coil spring operates, in dual fashion, to effect actuation of the spring clutch assembly, and to fully transfer torque loads, it will be appreciated that such requirements impose substantial structural complexity upon the coil spring. U.S. Pat. Nos. 4,570,318, 4,690,390, and 4,938,333 describe various modifications and improvements to the coil spring for, inter alia, alleviating stresses and/or stress concentrations therein.

SUMMARY OF THE INVENTION

It is an object of the present invention to provide a coil spring for an overrunning spring clutch assembly which reduces vibratory bending stresses in the teaser and transition coils of the coil spring.

This and other objects are achieved by a coil spring for use in an overrunning spring clutch assembly having a central arbor for centering and supporting the coil spring in an overrunning operating mode. The coil spring includes teaser coils disposed at each end thereof, central coils disposed intermediate the teaser coils, and transition coils disposed between and adjoining the teaser coils and the central coils. The coil spring is characterized by each of the transition coils having an interface surface being substantially complementary to a corresponding external bearing surface defined by the central arbor of the spring clutch assembly. Such substantially complementary relationship limits the radial deflection of the transition coils in an overrunning operating mode, thereby reducing vibratory bending stresses in the coil spring.

BRIEF DESCRIPTION OF THE DRAWINGS

A more complete understanding of the present invention and the attendant features and advantages thereof may be had by reference to the following detailed description of the invention when considered in conjunction with the following drawings wherein.

BEST MODE FOR CARRYING OUT THE INVENTION

A coil spring according present invention is specially adapted, particularly along the internal geometry of its teaser and transition coils to reduce vibratory bending stresses in an overrunning operating mode. As used herein, an "overrunning operating mode" is defined as any operating mode of the spring clutch assembly wherein the rotational speed of the output clutch member exceeds the rotational speed of the input clutch member. An example thereof includes a full-speed overrunning mode wherein the output clutch member rotates at a maximum overrunning speed and the input clutch member is fully-stopped. Yet another example includes a 99% differential overrunning mode wherein the rotational speed of the output clutch member is only slightly greater than the rotational speed of the input clutch member, e.g., 1% greater than the speed of the input clutch member.

Figure 2:
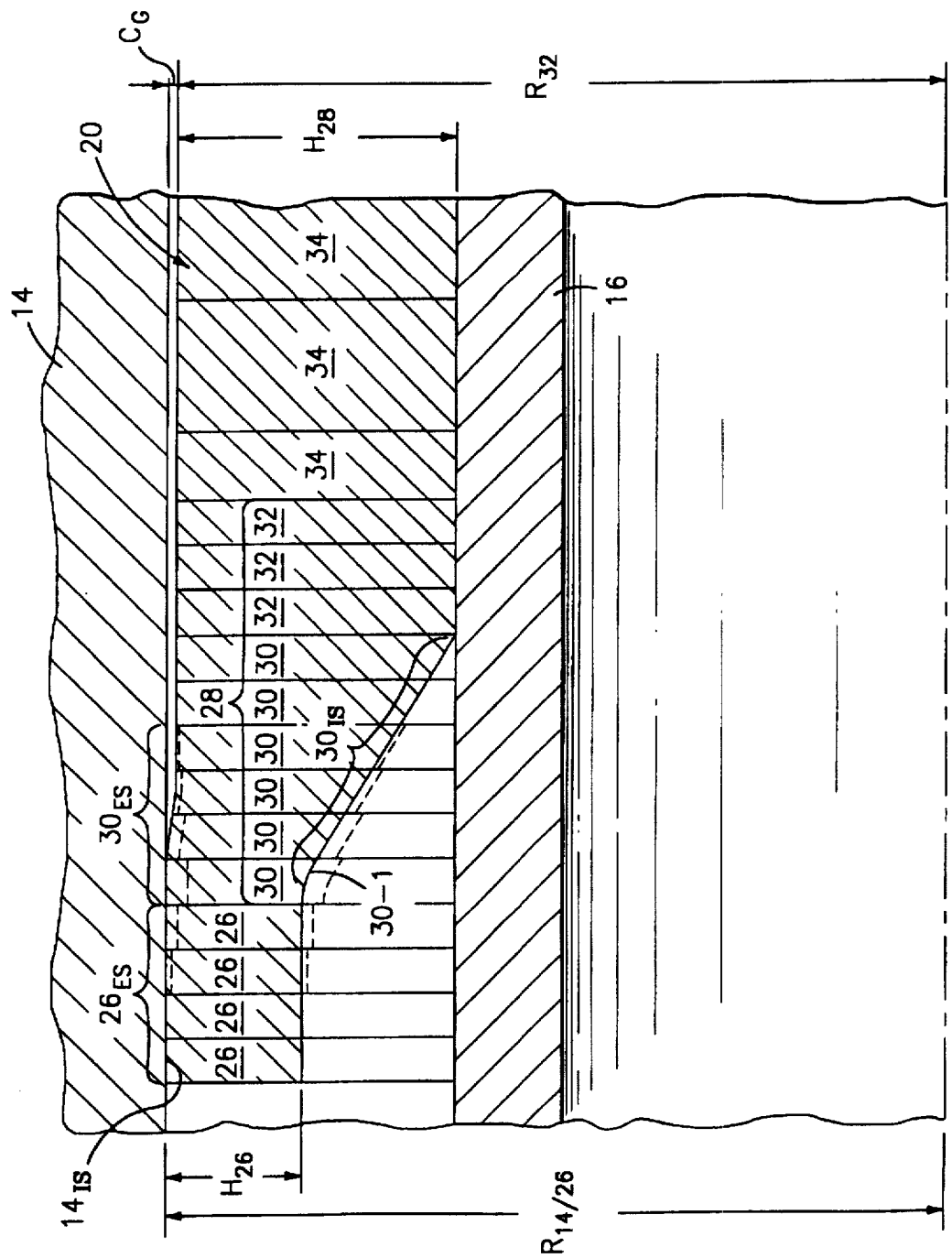
FIG. 2 is a cross-sectional view through an output end of a prior art coil spring for depicting the cross-sectional geometry of the teaser and transition coils thereof.

To acquire a better appreciation for the modifications and improvements to the coil spring of the present invention, a comparison is made to the prior art coil spring 20 and, particularly, to the configuration of the teaser and transition coils thereof. In FIG. 2, an enlarged cross-sectional view of the prior art coil spring 20 is shown for revealing the configuration of the teaser and transition coils 26 and 28, respectively, thereof. To facilitate illustration and discussion, only the output end of the coil spring 20 is shown, i.e., where the coils thereof engage the output clutch member 14. Accordingly, when discussing the various features of the teaser and transition coils 26, 28, it should be appreciated that the input end of the coil spring 20 is a mirror image of the output end, and that the number of teaser and transition coils 26, 28 are double for the entire coil spring 20.

The teaser coils 26 thereof comprise four (4) individual coils defining a substantially cylindrical external surface $26_{ES}$ and a substantially constant radial height $H_{26}$. As discussed in the Background of the Invention, the cylindrical external surface $26_{ES}$ of the teaser coils 26 frictionally engage the cylindrical inner surface $14_{IS}$ of the enveloping output clutch member 14 to effect actuation or overrunning of the spring clutch assembly. It should be understood that the teaser coils 26 are initially oversized with respect to the internal radius dimension $R_{14/26}$ of the output clutch member 14 and have a characteristic radial stiffness which is a function of the radial height $H_{26}$ of the teaser coils 26. This combination of geometric and stiffness characteristics effects a desired preload in the teaser coils 26, and, consequently, the requisite frictional force for proper functioning of the spring clutch assembly 10. As configured, the radial height of the teaser coils 26 is about ½ the maximum radial height $H_{28}$ defined by the transition coils 28 to produce the desired stiffness characteristics.

The transition coils 28 of the prior art coil spring 20 comprise nine (9) individual coils which function to gradually increase torque levels from the teaser coils 26 to a group of constant stress coils 34, hereinafter referred to as the central coils. More specifically, the transition coils 28 include six (6) outboard coils 30 proximal to the teaser coils 26, and three (3) inboard coils 32 proximal to central coils 34. The outboard coils 30 define an external surface $30_{ES}$ which effects a small reduction in radius from the preloaded radius $R_{14/26}$ of the teaser coils 26 to the radius $R_{32}$ of the outboard transition coils 32. Such reduction in radii effects a necessary clearance gap $C_G$ between the coil spring 20 and each of the clutch members or the central arbor 16 for permitting the coil spring 20 to expand radially outward in a torque drive operating mode or contract radially inward in an overrunning operating mode. The internal surfaces $30_{IS}$ of the outboard transition coils 28 are sloped to effect a gradual radial height transition from the teaser coils 26 to the inboard transition coils 32. As such, the gradual thickness transition mitigates stress concentrations in the transition coils 28.

While the prior art coil spring 20 has successfully undergone numerous prototype tests, the inventors discovered upon further testing, i.e., testing wherein all system components are integrated, that high vibratory bending stresses are induced in the prior art coil spring 20. More specifically, high vibratory stresses were developed in the outboard transition coils 30 during an overrunning operating mode which resulted in premature failure of the first outboard transition coil 30-1, proximal to the teaser coils 26. While the source of the problem is not entirely understood, it is believed that oscillatory torsional displacements of the coupled dynamic system may be altering the dynamic behavior of the prior art coil spring 20. Yet other explanations include self-induced oscillatory displacements due to manufacturing anomalies along the mating surfaces of the teaser coils 26 and the respective clutch member 14. Such manufacturing anomalies may have the effect of cyclically increasing and decreasing the frictional drag on the teaser coils 26, thereby producing the undesirable vibratory loads.

Notwithstanding the nature or origin of the problem, it has been determined that the high vibratory bending stress is a consequence of large radial displacements (shown in phantom) of the transition coils 28 and, furthermore, that such vibratory stress is a low cycle phenomena, i.e., induced whenever the spring alternates from an overrunning to a torque drive operating mode, and visa versa. It has also been concluded that various factors effecting the drag torque on the teaser coils are responsible for such large radial displacements. These factors include, inter alia, the friction coefficient between the teaser coils and the output clutch member, the number of teaser coils engaging the output clutch member, the interference pressure or preload acting on the teaser coils, the centrifugal forces developed by the rotating arbor, and the summation of bending moments from one coil to an adjacent inboard coil.

Figure 1:
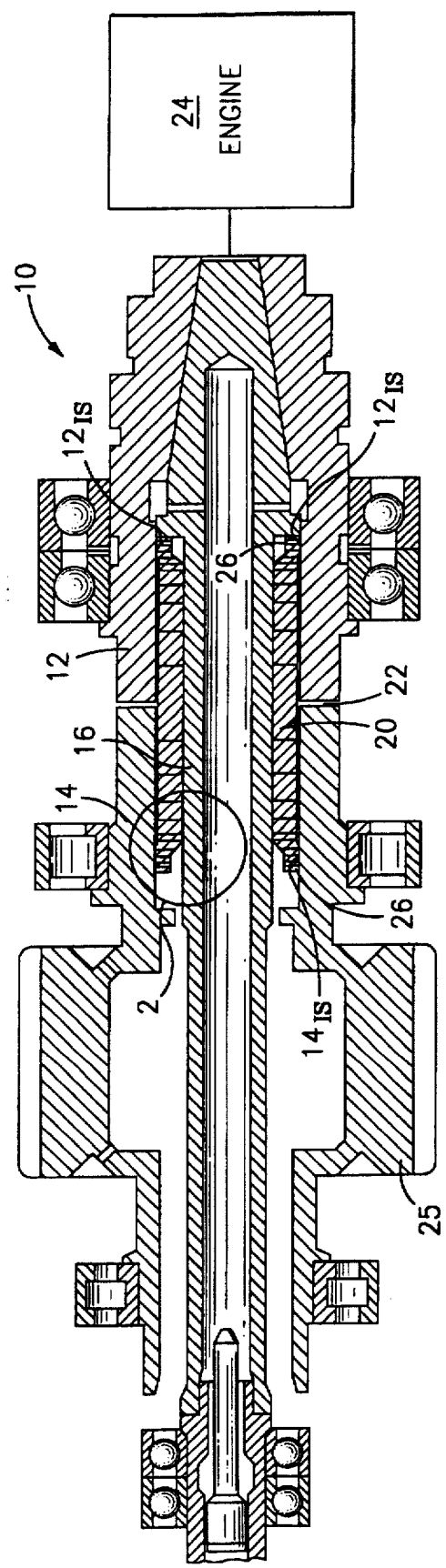
FIG. 1 is a partially sectioned and broken away view of an overrunning spring clutch assembly for revealing the internal details and arrangement thereof, including a coil spring for driving torque across and facilitating overrunning between input and output clutch members.
Figure 3:
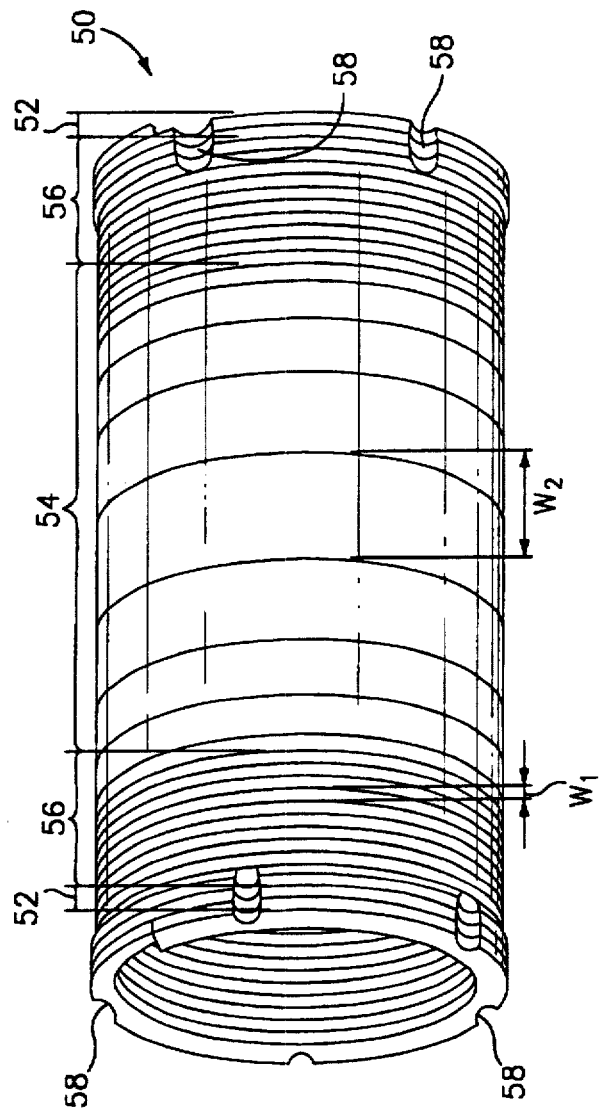
FIG. 3 is an isolated perspective view of a coil spring according to the present invention.

FIG. 3 depicts an isolated perspective view of a coil spring 50 according to the present invention for use in an overrunning spring clutch assembly (not shown). The coil spring 50 comprises teaser coils 52 disposed at opposite ends of the coil spring 50, central coils 54 disposed intermediate the teaser coils 52, and transition coils 56 disposed between and adjoining the teaser coils 52 and the central coils 54. Functionally, the teaser coils 52 frictionally engage coaxially aligned input and output clutch members (not shown) of the overrunning spring clutch assembly to effect engagement or disengagement of the coil spring 50, thereby driving torque across or permitting an overrunning condition between the clutch members. The transition coils 56 gradually increase the torque levels from the teaser coils 52 to the central coils 54 and the central coils 54 serve to transmit the preponderance of the torque loads through the coil spring 50.

In the described embodiment, the coil spring 50 is composed of a high cobalt steel (i.e., Co>10%) having a material density of about 0.283 $lbs_m/in^3$ (7.83 $g/cm^3$). Furthermore, the coil spring 50 is configured to drive approximately 5500 in-lbs (621.4 Nm) of steady torque and approximately 3,600 in-lbs (406.7 Nm) of vibratory torque across the input and output clutch members of the overrunning spring clutch assembly, and operates at about 23,000 revs/min. While the specific material selected and the precise configuration of the individual coils will vary depending upon the particular application, the width dimension $W_1$ of each teaser coil 52 and each transition coil 56 is constant and equals about 0.040 inches (0.1 cm) to about 0.044 inches (0.11 cm). The width dimension $W_2$ of each central coil 54 varies exponentially from about 0.040 inches (0.1 cm) to about 0.50 inches (1.27 cm) at the centermost or "cross-over" coil. Such exponentially varying width dimension effects a uniform distribution of axial stresses in the central coils 54. Furthermore, the teaser coils 52 include circumferentially spaced grooves 58 for ensuring that lubricating fluid is provided along the frictional interface between the teaser coils 52 and each of the clutch members. Additional details concerning the placement of such grooves 58 and the spring balance characteristics which may be affected thereby are described in Kish et al. U.S. Pat. No. 4,690,390.

Figure 4:
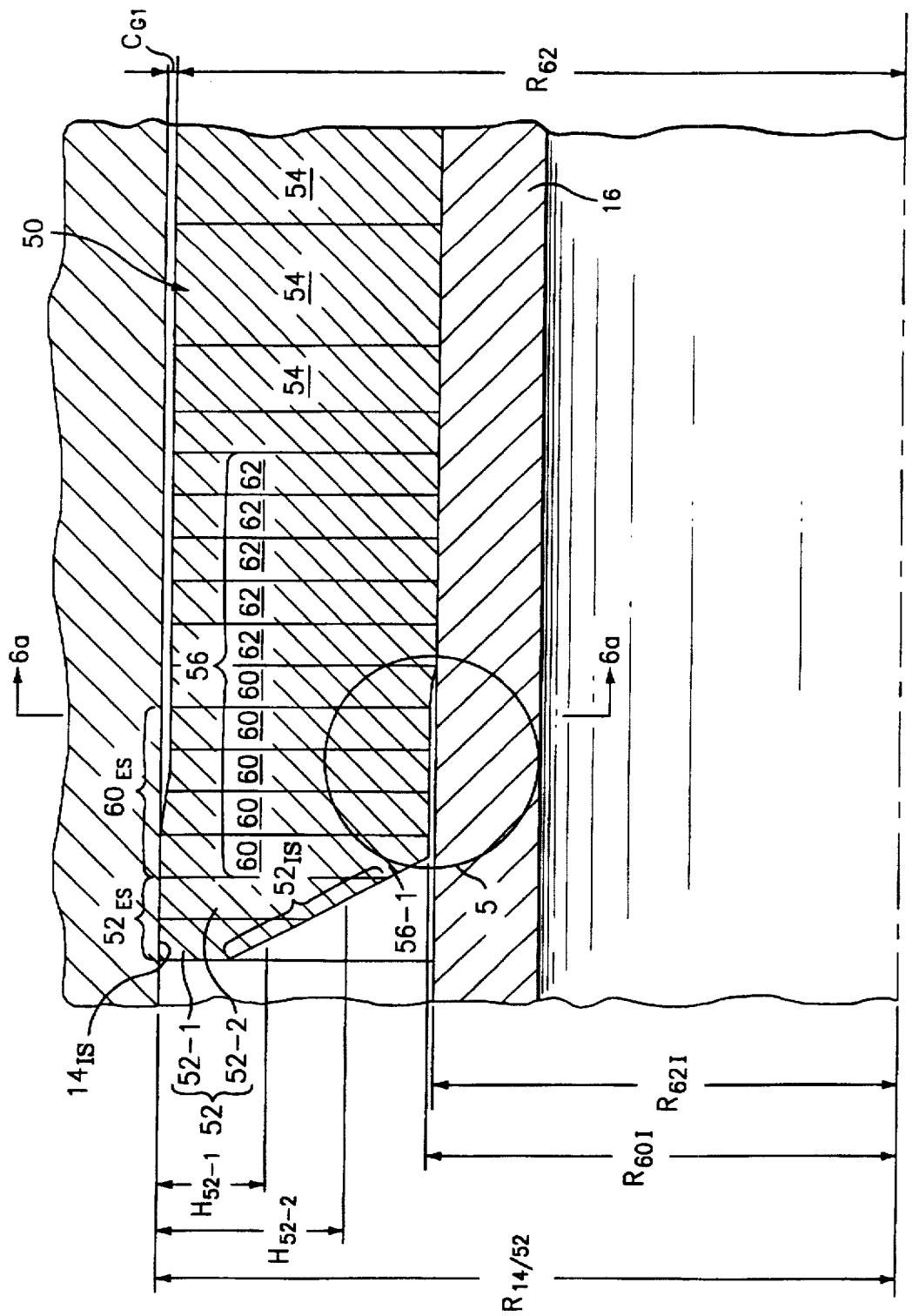
FIG. 4 is a cross-sectional view through an output end of the coil spring according to the present invention for depicting the cross-sectional geometry of the teaser and transition coils of the coil spring.

FIG. 4 depicts an enlarged cross-sectional view of the coil spring 50 according to the present invention corresponding to the view of the prior art coil spring 20 shown in FIG. 2. Elements which are functionally equivalent to those previously described, e.g., the central arbor 16, input and output clutch members 12, 14, will continue to be identified by their previous reference numerals. As will become apparent in light of the following description, the teaser and transition coils 52, 56 of the coil spring 50 have been modified to reduce vibratory bending stresses, and more particularly, to maintain such vibratory bending stresses below the fatigue stress allowables of the coil spring 50 in the transition coils 16 thereof. The modifications to the coil spring 50 are based on and described in terms of a predetermined external configuration of the central arbor 16 though it will be appreciated that the central arbor 16 may similarly be modified based on the internal configuration of the coil spring 50.

The teaser coils 52 comprise two (2) individual coils, i.e., first and second coils, 52-1 and 52-2, respectively, having aligned cylindrically shaped external surfaces $52_{ES}$ and aligned frustoconically shaped internal surfaces $52_{IS}$. The cylindrical external surfaces $52_{ES}$ engage the inner surface $14_{IS}$ of the output clutch member 14 to effect actuation or overrunning of the coil spring 50. In the preferred embodiment, the cross-sectional geometry of the teaser coils 52, i.e., the initial radial dimensions and transverse stiffness thereof, effect a frictional drag torque of about 3.5 in-lbs (0.395 Nm) during a full speed overrunning condition, and about 9.4 in-lbs (1.06 Nm) at a 99% differential speed overrunning condition. More specifically, the cylindrical external surfaces $52_{ES}$ define an initial radial dimension, i.e., prior to assembly, which is about 100.5% of the radial dimension $R_{14/52}$ defined by the inner surface $14_{IS}$ of the output clutch member 14. The frustoconical internal surfaces $52_{IS}$ effect a rapid increase in radial height/stiffness from the first teaser coil 52-1 to the outermost transition coil 56-1. The rapid increase in radial stiffness mitigates the propensity for the teaser coils 52, which are essentially unsupported, to deflect radially in an overrunning operating mode. In the preferred embodiment, the mean radial height $H_{52-1}$ of the first teaser coil 52-1 is between about 43% to about 57% of the maximum radial height $H_{56}$ defined by the transition coils 56. And, furthermore, the mean radial height $H_{52-2}$ of the second teaser coil 52-2 is between about 68% to about 82% of the maximum radial height $H_{56}$ of the transition coils 56.

The transition coils 56 comprise eleven (11) individual coils which may be further subdivided into five (5) outboard transition coils 60 proximal to the teaser coils 52 and six (6) inboard transition coils 62 proximal to the central coils 54. The external surfaces of the outboard transition coils 60 define a smooth curved surface $60_{ES}$ which effects a reduction in radius from the preloaded radial dimension $R_{14/52}$ of the teaser coils 52 to the radial dimension $R_{62}$ of the inboard transition coils 62. Such differential radial dimensions provide a small clearance gap $C_{G1}$ between the coil spring 50 and each of the clutch members, (only the output clutch member 14 is shown in FIG. 4). During a torque drive operating mode, the transition and central coils 56, 54 engage the clutch members, thereby closing the clearance gap $C_{G1}$ and, at the same instant, producing an internal separation gap (not shown), between the coil spring, 50 and the central arbor 16. As such, the coil spring 50 is decoupled from the arbor 16 to drive torque from the input to the output clutch member.

Figure 5:
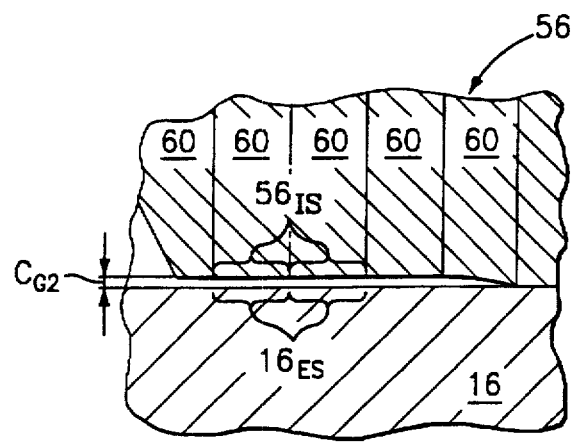
FIG. 5 is an enlarged view of the transition coils of the inventive coil spring wherein internal interface surfaces of the transition coils are substantially complementary to external bearing surfaces of a central arbor of an overrunning spring clutch assembly.

In FIGS. 4 and 5, each of the transition coils 56 defines an internal interface surface $56_{ES}$ which is substantially complementary to an external bearing surface $16_{ES}$ of the central arbor 16. In the context used herein, "substantially complementary" means that each internal interface surface $56_{IS}$ is either contiguous with the external bearing surface $16_{ES}$ of the central arbor 16 or separated by a small clearance gap $C_{G2}$ for facilitating assembly and/or for accommodating a small degree of flexural motion, i.e., "wobble" of the central arbor without inducing radial displacements in the transition coils 56. In the preferred embodiment, such clearance gap $C_{G2}$ is provided with respect to the outboard transition coils 60 and is produced by increasing the internal radial dimension $R_{601}$ of the outboard transition coils 60 relative to the internal radial dimension $R_{621}$ of the inboard transition coils 62. More specifically, the dimensional difference between the internal radial dimensions $R_{601}$, $R_{621}$ is between about 0.012 inches (0.03 cm) to about 0.006 inches (0.015 cm). In the described embodiment, the clearance gap $C_{G2}$ produced by the differential radial dimensions $R_{601}$, $R_{621}$ is approximately equal to the clearance gap $C_{G1}$ between the inboard transition coils 62 and the output clutch member 14.

Figure 6A:
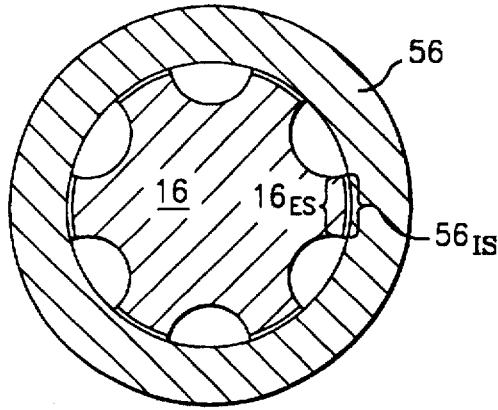
FIG. 6a is a cross-sectional view taken substantially along line 6a—6a of FIG. 4 for depicting an embodiment of the present invention wherein the internal interfaces surfaces of the coil spring are substantially complementary to external bearing surfaces of a central arbor having a splined or scalloped configuration.
Figure 6B:
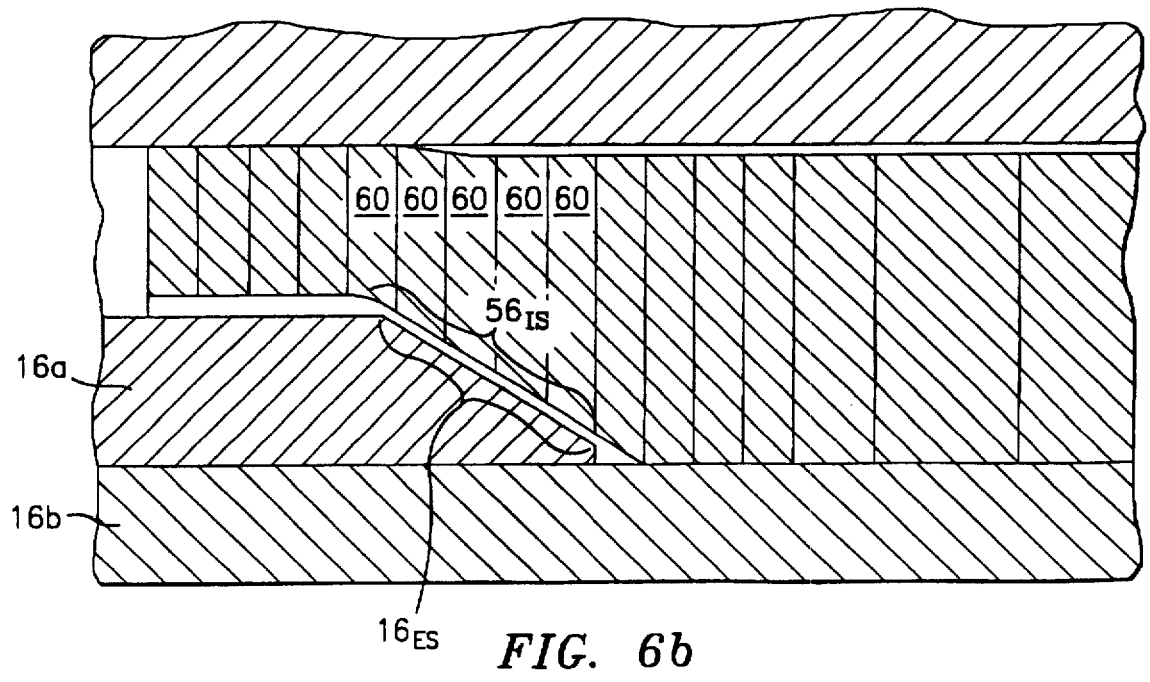
FIG. 6b is a cross-sectional view taken along the longitudinal axis of the coil spring depicting an embodiment of the present invention wherein the internal interface surfaces of the coil spring are substantially complementary to external bearing surfaces of a central arbor having a frustoconical configuration.

In an overrunning operating mode, the substantially complementary relationship of the interface surfaces $56_{IS}$ to the external bearing surfaces $16_{ES}$, limits the radial displacement of the transition coils 56 and, consequently, the peak vibratory bending stresses developed therein. In the broadest sense of the invention, the interface surfaces $56_{IS}$ and the external bearing surfaces $16_{ES}$ may have any cross-sectional configuration, provided that each interface surface $56_{IS}$ is substantially complementary to the corresponding external bearing surface $16_{ES}$ of the central arbor 16, i.e., the external bearing surface $16_{ES}$ which corresponds to the axial position of the respective interface surface $56_{IS}$. For example, in FIG. 6a, the transition coils 56, in combination, may define a cylindrical interface surface $56_{IS}$ having a substantially constant radial dimension while the central arbor 16 defines a scalloped or splined configuration. In this example, the cylindrically shaped interface surfaces $56_{IS}$ are substantially complementary to the external bearing surfaces $16_{ES}$ defined by the top lands of each spline. Yet another example is depicted in FIG. 6b wherein the central arbor 16 is comprised of multiple elements 16a and 16b and wherein one element 16a thereof defines a frustoconical shape. In this example, the interface surfaces $56_{IS}$ of the outboard transition coils 60 substantially conform to the frustoconical shape, i.e., the external bearing surfaces $16_{ES}$ of the central arbor 16 to limit the radial deflection of the outboard transition coils 60.

Table I below sets forth the maximum vibratory bending stresses developed in each teaser and transition coil of the prior art coil spring and of the coil spring of the present invention.

upon the design torque levels and rotational speed of the spring clutch assembly. Other variations may include the number of transition coils, initial preload of the teaser coils, and the size of the clearance gaps necessary to effect proper, i.e., non-interfering, operation of the spring clutch assembly.

In summary, each transition coil 56 of the inventive coil spring 50 is configured to be substantially complementary with the external bearing surfaces $16_{ES}$ of the central arbor 16, which configuration limits radial displacement of the transition coils 56 and, consequently, the peak vibratory bending stresses developed therein. Furthermore, the coil spring 50 of the present invention employs two $(_2)$ teaser coils 52 having a frustoconically shaped internal surface $52_{IS}$ for rapidly increasing the radial height of the teaser coils 52. While many of the above mentioned factors, such as the friction coefficients, interference pressure or preload and summation of torque levels acting on the teaser coils 52, must be iteratively examined, the radial height transition effects a rapid stiffness transition which decreases bending stresses developed in the teaser coils 52. In contrast, the prior art coil spring employs four (4) teaser coils having a substantially constant radial height which produces comparably low radial stiffness values. These undesirable stiffness characteristics in combination with the unsupported configuration of the outboard transition coils produce large radial deflections and the resultant high bending stresses.

TABLE I

| Prior Art Coil Spring | Vibratory Bending Stress (lbs/in², kPa) | Coil Spring of the present invention | Vibratory Bending Stress (lbs/in², kPa) |
|---|---|---|---|
| Teaser Coil #1 | ±29590 lbs/in² ±204012 kPa | Teaser Coil #1 | ±29945 lbs/in² ±206460 kPa |
| Teaser Coil #2 | ±56940 lbs/in² ±392581 kPa | Teaser Coil #2 | ±13460 lbs/in² ±92802 kPa |
| Teaser Coil #3 | ±70545 lbs/in² ±486383 kPa | Transition Coil #1 | ±71315 lbs/in² ±491692 kPa |
| Teaser Coil #4 | ±77310 lbs/in² ±533025 kPa | Transition Coil #2 | ±71315 lbs/in² ±491692 kPa |
| Transition Coil #1 | ±118710 lbs/in² ±818464 kPa | Transition Coil #3 | ±71315 lbs/in² ±491692 kPa |
| Transition Coil #2 | ±94005 lbs/in² ±648132 kPa | Transition Coil #4 | ±71340 lbs/in² i491864 kPa |
| Transition Coil #3 | ±75965 lbs/in² ±523752 kPa | Transition Coil #5 | ±71370 lbs/in² ±492071 kPa |
| Transition Coil #4 | ±41090 lbs/in² ±283301 kPa | Transition Coil #6 | ±45415 lbs/in² ±313121 kPa |
| Transition Coil #5 | ±43100 lbs/in² ±297159 kPa | Transition Coil #7 | ±45415 lbs/in² ±313121 kPa |
| Transition Coil #6 | ±44375 lbs/in² ±305950 kPa | Transition Coil #8 | ±45415 lbs/in² ±313121 kPa |
| Transition Coil #7 | ±44555 lbs/in² ±307191 kPa | Transition Coil #9 | ±45415 lbs/in² ±313121 kPa |
| Transition Coil #8 | ±44555 lbs/in² ±307191 kPa | Transition Coil #10 | ±45415 lbs/in² ±313121 kPa |
| Transition Coil #9 | ±44555 lbs/in² ±307191 kPa | Transition Coil #11 | ±45415 lbs/in² ±313121 kPa |

By examination of Table I, it will be apparent that the peak vibratory bending stress developed in the coil spring of the present invention (i.e., in the first transition coil) is about 40% less than the peak vibratory bending stresses developed in the prior art coil spring (i.e., in the first transition coil or in any coil thereof).

While the coil spring of the present invention has been described in terms of a specific number of coils, individual coils having a particular width and or radial height, desired preload values etc., it will be appreciated that various changes may be made thereto while remaining within the spirit and scope of the invention. For example, the width, height and radial dimension of each coil will vary depending

What is claimed is:

1. A coil spring (50) including teaser coils (52) disposed at each end thereof, central coils (54) disposed intermediate the teaser coils (52), and transition coils (56) disposed between and adjoining the teaser coils (52) and the central coils (54), the coil spring (50) operative for use in an overrunning spring clutch assembly having a central arbor (16) for centering and supporting the coil spring (50) in an overrunning operating mode, the central arbor (16) having an external bearing surface ($16_{ES}$) corresponding to each of the transition coils (56), the coil spring (50) being characterized by:

each of said transition coils (56) defining an interface surface ($56_{IS}$), said interface surface ($56_{IS}$) being substantially complementary to the corresponding external bearing surface ($16_{ES}$) of the central arbor (16) for limiting radial deflection of said transition coils (56) in the overrunning operating mode.

2. The coil spring (50) according to claim 1 wherein said interface surfaces ($56_{IS}$) of said transition coils (56), in combination, define a substantially cylindrical shape.

3. The coil spring (50) according to claim 1 wherein said transition coils (56) include outboard and inboard transition coils (60, 62), said outboard transition coils (60) defining an internal radial dimension $R_{60}$ and said inboard transition coils (62) defining and internal radial dimension $R_{62}$, said internal radial dimension $R_{60}$ of said outboard transition coils (60) being greater than said internal radial dimension $R_{62}$ of said inboard transition coils (62).

4. The coils spring (50) according to claim 3 wherein said internal radial dimensions $R_{60}$, $R_{62}$ of said inboard and outboard transition coils (60, 62) define a dimensional difference, said dimensional difference having a value between about 0.012 inches (0.03 cm) to about 0.006 inches (0.015 cm).

5. The coil spring (50) according to claim 1 wherein said interface surfaces ($56_{IS}$) of said transition coils (56), in combination, define a substantially cylindrical shape, and being further characterized by each of said teaser coils (52) having an internal surface ($52_{IS}$), said internal surfaces ($52_{IS}$), in combination, defining a substantially frustoconical shape.

6. The coil spring (50) according to claim 5 being further characterized by said teaser coils (52) and said transition coils (56) having a plurality of individual coils, said individual coils having a constant width dimension $W_1$.

7. The coil spring (50) according to claim 6 wherein said transition coils (56) define a maximum radial height ($H_{56}$), wherein said teaser coils include first and second teaser coils (52-1, 52-2), said first coil and second teaser coils (52-1, 52-2) each defining a mean radial height ($H_{52-1}$, $H_{52-2}$), said mean radial height ($H_{52-1}$) of said first teaser coil (52-1) being between about 43% to about 57% of said maximum radial height ($H_{56}$) of said transition coils (56), and said mean radial height ($H_{52-2}$) of said second teaser coil (52-2) being between about 68% to about 80% of said maximum radial height ($H_{56}$) of said transition coils (56).

8. An overrunning spring clutch having a coil spring (50) including teaser coils (52) disposed at each end thereof, central coils (54) disposed intermediate the teaser coils (52), and transition coils (56) disposed between and adjoining the teaser coils (52) and the central coils (54), the overrunning spring clutch assembly, furthermore, having a central arbor (16) for centering and supporting the coil spring (50) in an overrunning operating mode, the central arbor (16) having an external bearing surface ($16_{ES}$) corresponding to each of the transition coils (56), the overrunning spring clutch being characterized by:

each of said transition coils (56) of said coil spring (50) defining an interface surface ($56_{IS}$), said interface surface ($56_{IS}$) being substantially complementary to the corresponding external bearing surface ($16_{ES}$) of the central arbor (16) for limiting radial deflection of said transition coils (56) in the overrunning operating mode.

9. The overrunning spring clutch according to claim 8 wherein said interface surfaces ($56_{IS}$) of said coil spring (50), in combination, define a substantially cylindrical shape.

10. The overrunning spring clutch according to claim 8 wherein said transition coils (56) of said coil spring (50) include outboard and inboard transition coils (60, 62), said outboard transition coils (60) defining an internal radial dimension $R_{60}$ and said inboard transition coils (62) defining and internal radial dimension $R_{62}$, said internal radial dimension $R_{60}$ of said outboard transition coils (60) being greater than said internal radial dimension $R_{62}$ of said inboard transition coils (62) so as to produce a clearance gap $C_{G2}$ between said outboard transition coils (60) and said central arbor (16).

11. The overrunning spring clutch according to claim 10 wherein said clearance gap $C_{G2}$ is between about 0.012 inches (0.03 cm) to about 0.006 inches (0.015 cm).

12. The overrunning spring clutch according to claim 8 wherein said interface surfaces ($56_{IS}$) of said coil spring (50), in combination, define a substantially cylindrical shape and being further characterized by each of said teaser coils (52) having an internal surface ($52_{IS}$), said internal surfaces ($52_{IS}$), in combination, defining a substantially frustoconical shape.

13. The overrunning spring clutch according to claim 12 being further characterized by said teaser coils (52) and said transition coils (56) of said coil spring 50 including a plurality of individual coils, said individual coils having a constant width dimension $W_1$.

14. The coil spring (50) according to claim 13 wherein said transition coils (56) define a maximum radial height ($H_{56}$), wherein said teaser coils include first and second teaser coils (52-1, 52-2), said first coil and second teaser coils (52-1, 52-2) each defining a mean radial height ($H_{52-1}$, $H_{52-2}$), said mean radial height ($H_{52-1}$) of said first teaser coil (52-1) being between about 43% to about 57% of said maximum radial height ($H_{56}$) of said transition coils (56), and said mean radial height ($H_{52-2}$) of said second teaser coil (52-2) being between about 68% to about 80% of said maximum radial height ($H_{56}$) of said transition coils (56).

* * * * *